(12) United States Patent
Brown

(10) Patent No.: US 11,062,235 B1
(45) Date of Patent: *Jul. 13, 2021

(54) PREDICTIVE POWER MANAGEMENT IN A WIRELESS SENSOR NETWORK

(71) Applicant: Invent.ly, LLC, Malibu, CA (US)

(72) Inventor: Stephen J. Brown, Malibu, CA (US)

(73) Assignee: Invent.ly, LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,665

(22) Filed: Feb. 13, 2020

Related U.S. Application Data

(63) Continuation of application No. 16/169,278, filed on Oct. 24, 2018, now Pat. No. 10,607,157, which is a continuation of application No. 15/661,150, filed on Jul. 27, 2017, now Pat. No. 10,133,989, which is a
(Continued)

(51) Int. Cl.
*G05D 3/12* (2006.01)
*G06N 20/00* (2019.01)
*G06F 5/00* (2006.01)
*G05F 5/00* (2006.01)
*G06N 5/04* (2006.01)

(52) U.S. Cl.
CPC ............... *G06N 20/00* (2019.01); *G05F 5/00* (2013.01); *G06N 5/046* (2013.01)

(58) Field of Classification Search
CPC .................................................... G06N 99/005
USPC .................................................. 700/286–306
See application file for complete search history.

(56) References Cited

U.S. PATENT DOCUMENTS

| 5,754,436 A * | 5/1998 | Walsh ................... G06F 1/3203 |
| | | 700/286 |
| 5,790,875 A * | 8/1998 | Andersin .............. G06F 1/3209 |
| | | 713/320 |

(Continued)

OTHER PUBLICATIONS

Wang, Qin, and Woodward Yang. "Energy consumption model for power management in wireless sensor networks." 2007 4th Annual IEEE Communications Society Conference on Sensor, Mesh and Ad Hoc Communications and Networks. IEEE, 2007. pp. 142-151 (Year: 2007).*

(Continued)

*Primary Examiner* — Satish Rampuria
(74) *Attorney, Agent, or Firm* — Christopher P. Maiorana, PC

(57) ABSTRACT

An apparatus comprising a power source, one or more sensors, a transceiver, and a memory. The power source may be configured to store energy to power the apparatus. The one or more sensors may be configured to receive captured data from one of a plurality of sources. The transceiver may be configured to send and receive data to and from a wireless network. The processor may be configured to execute computer readable instructions. The memory may be configured to store a set of instructions executable by the processor. The instructions may be configured to (A) evaluate an expected power usage budget calculated using a predictive model of future energy consumption and (B) (i) store the captured data in the memory in a first mode and (ii) transmit the captured data to a remote storage device in a second mode. The first mode or the second mode is selected based on characteristics of the captured data received from the sensors.

19 Claims, 7 Drawing Sheets

Related U.S. Application Data continuation of application No. 14/090,099, filed on Nov. 26, 2013, now Pat. No. 9,721,210.

(56) References Cited

U.S. PATENT DOCUMENTS

| | | | | |
|---|---|---|---|---|
| 6,128,743 | A * | 10/2000 | Rothenbaum | G06F 1/266 710/100 |
| 6,178,514 | B1 * | 1/2001 | Wood | G06F 1/266 713/300 |
| 8,457,795 | B1 * | 6/2013 | Rubin | F25D 29/003 700/275 |
| 8,897,820 | B2 * | 11/2014 | Marovets | H04W 8/245 455/466 |
| 9,680,779 | B2 * | 6/2017 | Marovets | H04L 51/08 |
| 10,133,989 | B1 * | 11/2018 | Brown | G06N 20/00 |
| 10,417,413 | B2 * | 9/2019 | Sikder | G06F 21/52 |
| 2002/0072868 | A1 * | 6/2002 | Bartone | H02J 3/14 702/62 |
| 2013/0339104 | A1 * | 12/2013 | Bose | G06Q 10/0637 705/7.37 |

OTHER PUBLICATIONS

Dargie, Waltenegus. "Dynamic power management in wireless sensor networks: State-of-the-art." IEEE Sensors Journal 12.5 (2011): pp. 1518-1528. (Year: 2011).*

Passos, Rodrigo M., et al. "Dynamic power management in wireless sensor networks: An application-driven approach." Second Annual Conference on Wireless On-demand Network Systems and Services. IEEE, 2005.pp. 1-10 (Year: 2005).*

* cited by examiner

PREDICTIVE POWER MANAGEMENT IN A WIRELESS SENSOR NETWORK

This application relates to U.S. Ser. No. 16/169,278, filed Oct. 24, 2018; which relates to U.S. Ser. No. 15/661,150, filed Jul. 27, 2017, now U.S. Pat. No. 10,133,983, which relates to U.S. Ser. No. 14/090,099, filed Nov. 26, 2013, now U.S. Pat. No. 9,721,210, which are each incorporated by reference in their entirety.

FIELD OF THE INVENTION

The present invention relates to power management generally and, more particularly, to predictive power management in a wireless sensor network.

BACKGROUND OF THE INVENTION

Wireless sensor networks have been proposed for a wide range of monitoring applications in various industries, such as health care, energy, transportation, infrastructure, agriculture, security, the environment and many other fields. Billions of active sensors have been installed that can wirelessly connect to networks and capture data. Such an installed base of sensors creates issues such as powering such sensors as well as transporting and storing the data received from the sensors.

Various conventional approaches have been developed in response to particular constraints. Microelectronics companies are concerned with creating low power devices with energy harvesting technologies and improved batteries. Communications companies are continuing to build out networks with more radio towers, improved data compression and adherence to interference regulations. Cloud computing companies are developing approaches for storing more data with data structures suited for the expected exponential growth in capturing data. Such conventional approaches are unlikely to be sufficient with the grand vision of the "Internet of Things". The communications bandwidth (and data storage on the Internet to implement such an approach) could include hundreds of times as many sensors as conventional smartphones, potentially consuming the highest amount of energy of the Internet.

Most conventional approaches are based on autonomous sensor notes that are always on and capture and transmit large amounts of sensor data to a network that always needs to be listening and recording the transmissions. The network then needs to relay back an acknowledgment to the sensor that the data was accurately received. If scaled to a trillion sensors, a huge number of devices would need to be implemented with batteries that would be unaffordable (or at least inconvenient) to change. A huge amount of traffic on already congested networks would further increase the power needs of each device, since higher antenna output would likely be needed to overcome interference and noise.

Different approaches are needed. The motivation of a better approach stems from a more fundamental question—Why do we need all of this data anyway? The data and related power needs of capturing, transmitting and recording data are highly context and application dependent. Most conventional sensors blindly capture and transmit data. Such sensors assume the application needs or knows what to do with that data. Some data inevitably are more important than others. The importance of data can vary with time and with the knowledge embedded in the application.

It would be desirable to implement predictive power management in a wireless sensor network.

SUMMARY OF THE INVENTION

The present invention concerns an apparatus comprising a power source, one or more sensors, a transceiver, and a memory. The power source may be configured to store energy to power the apparatus. The one or more sensors may be configured to receive captured data from one of a plurality of sources. The transceiver may be configured to send and receive data to and from a wireless network. The processor may be configured to execute computer readable instructions. The memory may be configured to store a set of instructions executable by the processor. The instructions may be configured to (A) evaluate an expected power usage budget calculated using a predictive model of future energy consumption and (B) (i) store the captured data in the memory in a first mode and (ii) transmit the captured data to a remote storage device in a second mode. The first mode or the second mode is selected based on characteristics of the captured data received from the sensors.

The objects, features and advantages of the present invention include power management in a network that may (i) predict power needs, (ii) operate with wireless sensors, (iii) change data processors depending on data context and/or (iv) be energy efficient.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Embodiments of the invention provide a context-aware and/or power-aware wireless sensor network system that enables application needs to determine which data is captured, transmitted and/or stored at the edge of the wireless sensor network. Such an implementation may result in lower power usage, lower bandwidth usage, less interference, and/or less storage and/or processing capacity in the cloud. The determination of which data is important may change and may be determined based on context and/or knowledge. The sensor system is highly adaptable. A software application can reprogram the sensor nodes with new instructions as data needs change and/or grow more complex. Additionally, the power management of the sensor nodes is application-driven to prioritize limited power resources according to the application needs. Power resources may be calculated based on available energy, a power budget, predicted future power needs and/or energy harvesting opportunities.

Figure 1:
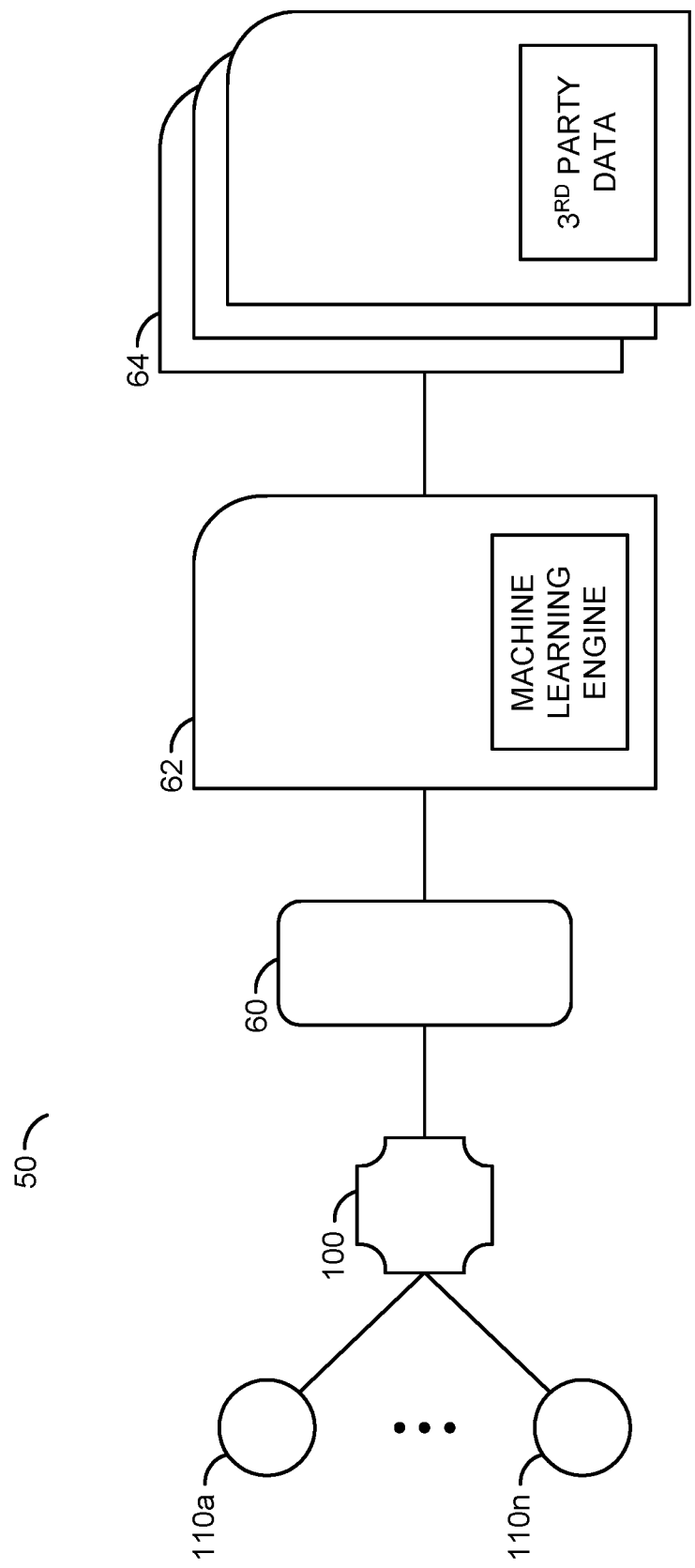
FIG. 1 is a block diagram illustrating a context of the invention.

Referring to FIG. 1, a block diagram of a system 50 is shown implementing a context of the present invention. The system is shown comprising a block 60, a block 62, a block 64, and a block 100. The block 60 may be implemented as a mobile computing device. The block 62 may be implemented as a network data services device. The block 64 may be implemented as a network computing services device. The block 100 may be implemented as a device, such as a wireless sensor node. In one example, the device 100 may be implemented as part of the mobile computing device 60. The device 100 is shown receiving inputs from a number of blocks 110a-110n. The blocks 110a-110n may be implemented as sensors. The sensors 110a-110n may also be referenced as sensors A, B, C, etc. The block 110a may represent (or capture) a contextual logic signal. Another block (e.g., 110b) may represent (or capture) a beacon signal. The block 110n may represent (or capture) a proximity signal. Various other signals may be captured by the sensor node 100.

Figure 2:
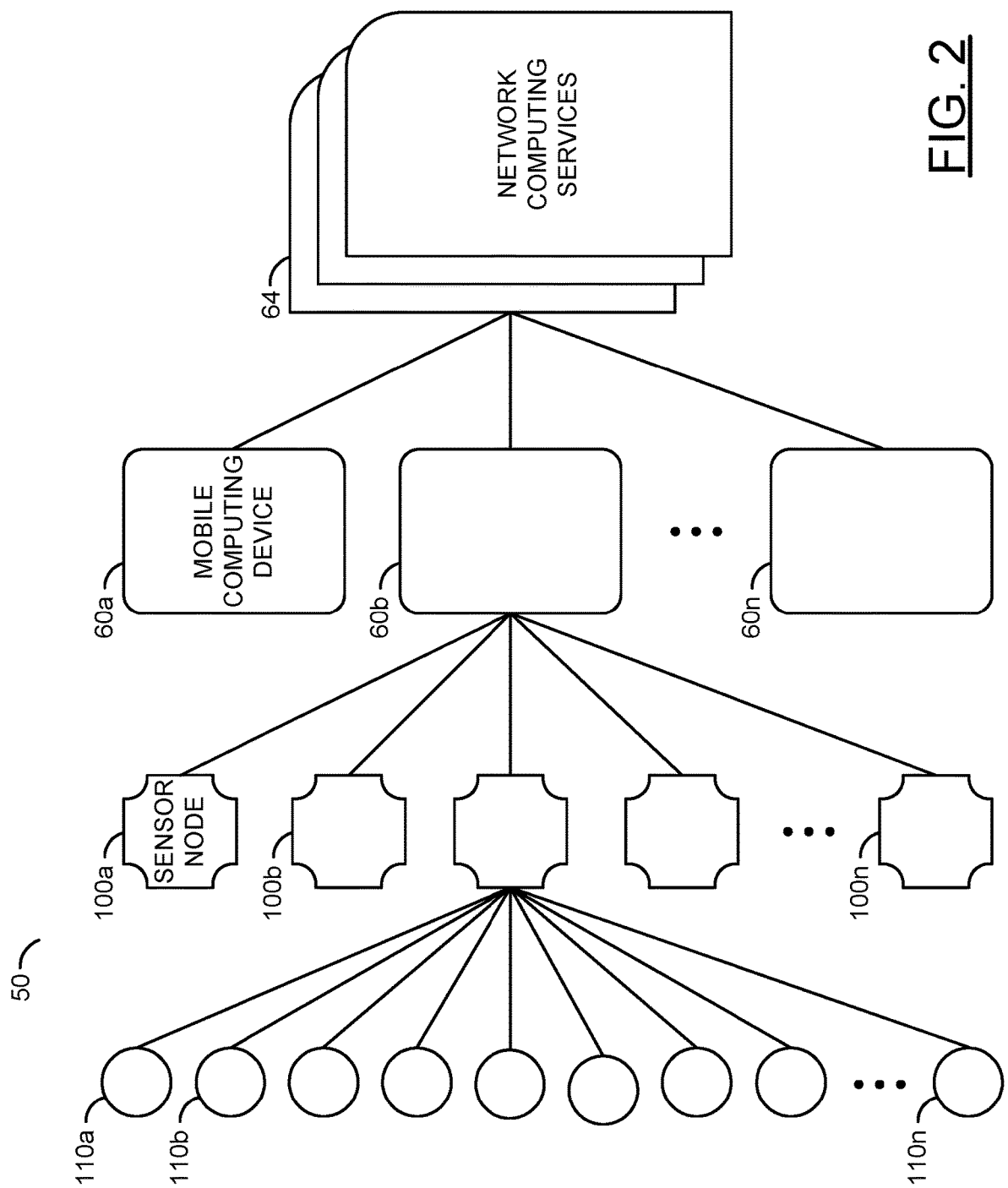
FIG. 2 is a block diagram showing an implementation with multiple sensor nodes.

Referring to FIG. 2, a diagram illustrating a plurality of sensor nodes 100a-100n is shown. The sensor nodes 100a-100n are shown connected to a mobile computing device 60b. However, some of the sensor nodes 100a-100n may be connected to a mobile computing device 60a, while others may be connected to the mobile computing device 60b, while still others may be connected to a mobile computing device 60n. The particular number of sensor nodes 100a-100n and wireless computing devices 60a-60n may be varied to meet the design criteria of a particular implementation.

Each of the sensor nodes 100a-100n may have a power budget based on predicted energy input and/or energy output needs. For example, an energy input need may be a function of past patterns and/or cycles as well as predictable future opportunities to harvest energy from the environment (e.g., weather and/or day/night/seasonal patterns on a photovoltaic device, etc.), at least up to the storage capacity. The predicted energy expenditures may also be based on the predicted power consumed given known upcoming calendar and/or event data as well as other inputs.

A context-aware activation signal may be used to wake up the device 100. The device 100 may begin sensing and/or processing other data, and/or provide power management that is context-aware. A higher priority may be placed on processing certain data. Such data may be data deciding whether to spend more power to transfer the data with less delay and/or more reliability. For example, logic may be implemented to boost radio power based on priority and/or distance from a cellular tower. Such logic may minimize the radio power that may otherwise reduce interference with other sensors.

One or more of sensors 110a-110n may be implemented internally as a beacon signal sensor or as a radiation sensor, a blood glucose sensor, a proximity sensor, chemical/gas sensor, blood pressure sensor, a location sensor, a pollution sensor, a heart rate sensor, a vibration sensor, an air flow sensor, a heart rate variability sensor, an acceleration sensor, a fluid flow sensor, a skin conductance sensor, a position sensor, a direction sensor, a rotation sensor, a weight sensor, a displacement sensor, a machine operations sensor, a fluid retention sensor, a velocity sensor, a leakage sensor, a respiration sensor, a magnetic field, a microphone, an ECG, one or more derived quantities, temperature, image, color, pulse oximetry, physical pressure, odor, drug delivery, air pressure, voltage, container opening, etc. One or more of the sensors 110a-110n, or a combination of the sensors 110a-110n may be implemented internally as part of the sensor node 100 (e.g., within a sensor node housing), or alternatively may be implemented externally (e.g., as a separate sensing device coupled to the sensor node 100). Additionally, the sensors 110a-110n may transmit data directly to a network, in which case the sensor node 100 may receive data as a network data source. Such network data sources may include, for example, environmental or weather data, location-based data, proximity data, etc.

Figure 3:
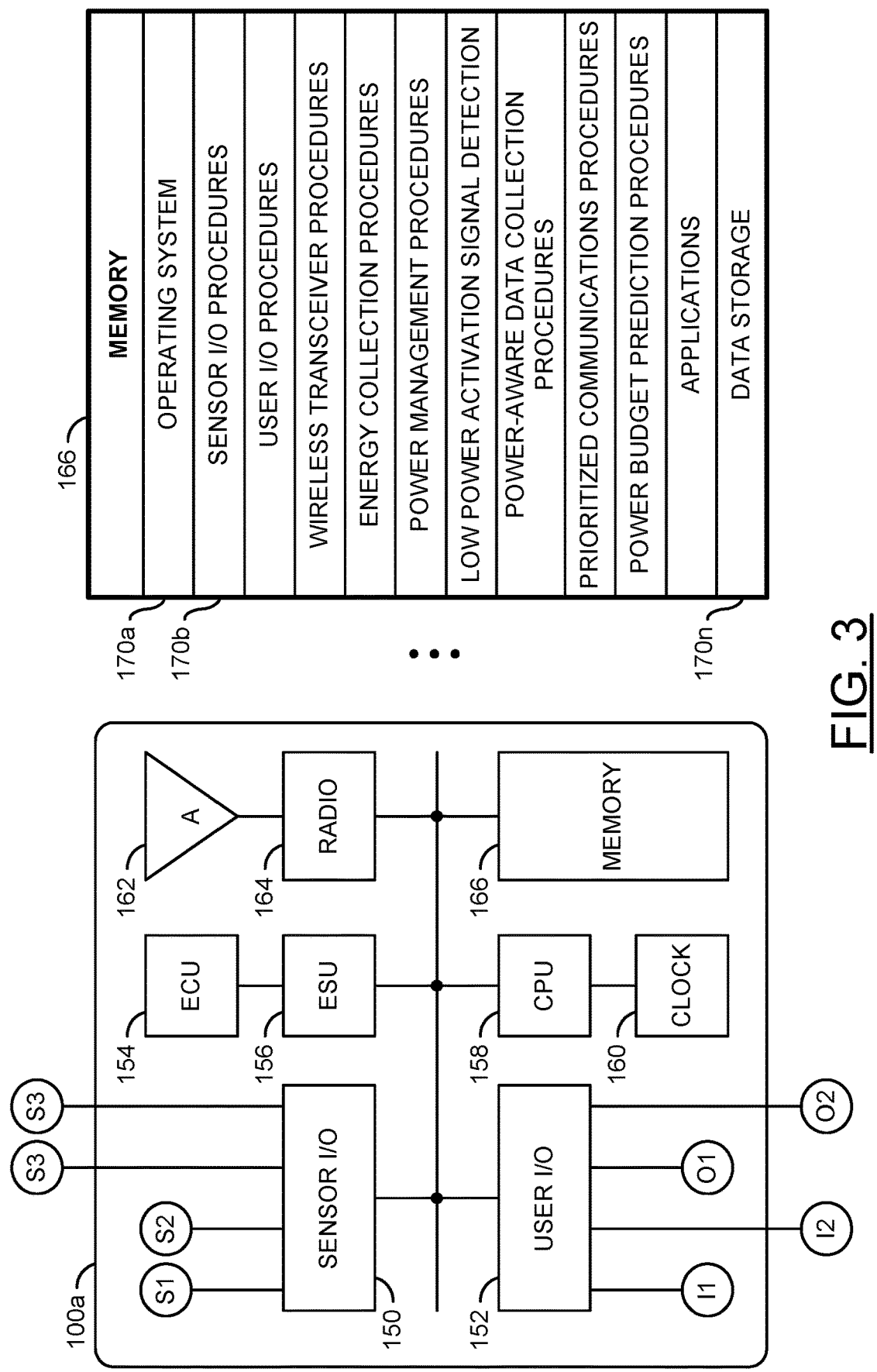
FIG. 3 is a more detailed diagram of one of the nodes.

The various sensors 110a-110n may be configured in one of a number of categories, such as a logical condition, a fluid/gas level, a biological process, etc. The logical conditions may be further configured to receive signals from devices such as a beacon, a proximity sensor, a location sensor, a vibration sensor, an acceleration sensor, a position/direction sensor, a displacement velocity sensor, a magnetic field sensor, a temperature sensor, a physical pressure sensor, an air pressure sensor, a force/strain sensor, a moisture/humidity sensor, etc. The fluid/gas level category of sensors may be implemented to receive signals from devices such as a radiation sensor, a chemical/gas sensor, a pollution sensor, an air flow sensor, a fluid flow sensor, a rotation sensor, a machine operations sensor, a leakage sensor, a microphone, an image/color sensor, an odor sensor, a voltage sensor, an electrical sensor, a current sensor, a gyroscope, etc. The biological process category of sensors may be configured to receive signals from devices such as a blood glucose sensor, a blood pressure sensor, a heart rate sensor, a heart rate variability sensor, a skin conductance sensor, a weight measuring device, a fluid retention sensor, a respiration device, and ecg, a pulse oximetry device, a drug delivery device, a container opening device, a medication dispensing device, a microbial device, etc. Referring to FIG. 3, a more detailed diagram of one of the sensor nodes 100a is shown. Each of the self-powered sensor nodes 100a-100n may include a processor, an RF transceiver, an energy storage unit, one or more sensors and a memory. The memory may store a set of instructions executable by the processor to evaluate and selectively store sensed data in the memory or transmit sensed data based on sensor data values and the stored instructions. The remote computing device 60 may be located separately from the sensor node 100a. The device 60 may be selectively coupled to one of the sensor nodes 100a-100n to collect stored data and/or to transmit new instructions to the sensor node.

The sensor node 100a is shown comprising a block 150, a block 152, a block 154, a block 156, a block 158, a block 160, a block 162, a block 164, and a block 166. The block 150 may be implemented as a sensor I/O. The block 152 may be implemented as a user I/O circuit. The block 154 may be implemented as an energy capture unit (ECU). The block 156 may be implemented as an energy storage unit (ESU). The block 158 may be implemented as a CPU (or processor) circuit. The block 160 may be implemented as a clock generation circuit. The block 162 may be implemented as an antenna. The block 164 may be implemented as a radio. The antenna 162 and the radio 164 may form a transceiver. The block 166 may be implemented as a memory. Details of the memory 166 are shown by the blocks 170a-170n.

The output portion of the user I/O 152 may be configured to preset one or more signals to a speaker, a display, an LED, a vibrator, an actuator, an electrical field, a magnetic field, etc. The signals presented to the I/O 152 may be an electrical signal (such as a DC signal), a data signal, etc. The input portion of the user I/O 152 may be configured to receive signals from a microphone, a camera, a light sensor, a motion sensor, a position sensor, a button, a touch screen, a proximity sensor, etc. The signals presented to the I/O 152 may be an electrical signal, such as a DC signal, a data signal, etc.

In one example, the sensor 100 may implement a learning process and/or predictive modeling on the CPU 158 (to be described in more detail in connection with FIGS. 4-6). New rules may be stored in the memory 166. In another example, the machine learning process(es) may be run on the mobile computing device 60 and/or the network computing services block 64. The processing power and energy to implement the learning process(es) may use more aggregated data and/or processing power than the sensor 100 can process efficiently while running on the energy storage unit 156. By offloading the processing, the overall energy used by the sensors 100*a*-100*n* may be reduced.

Figure 4:
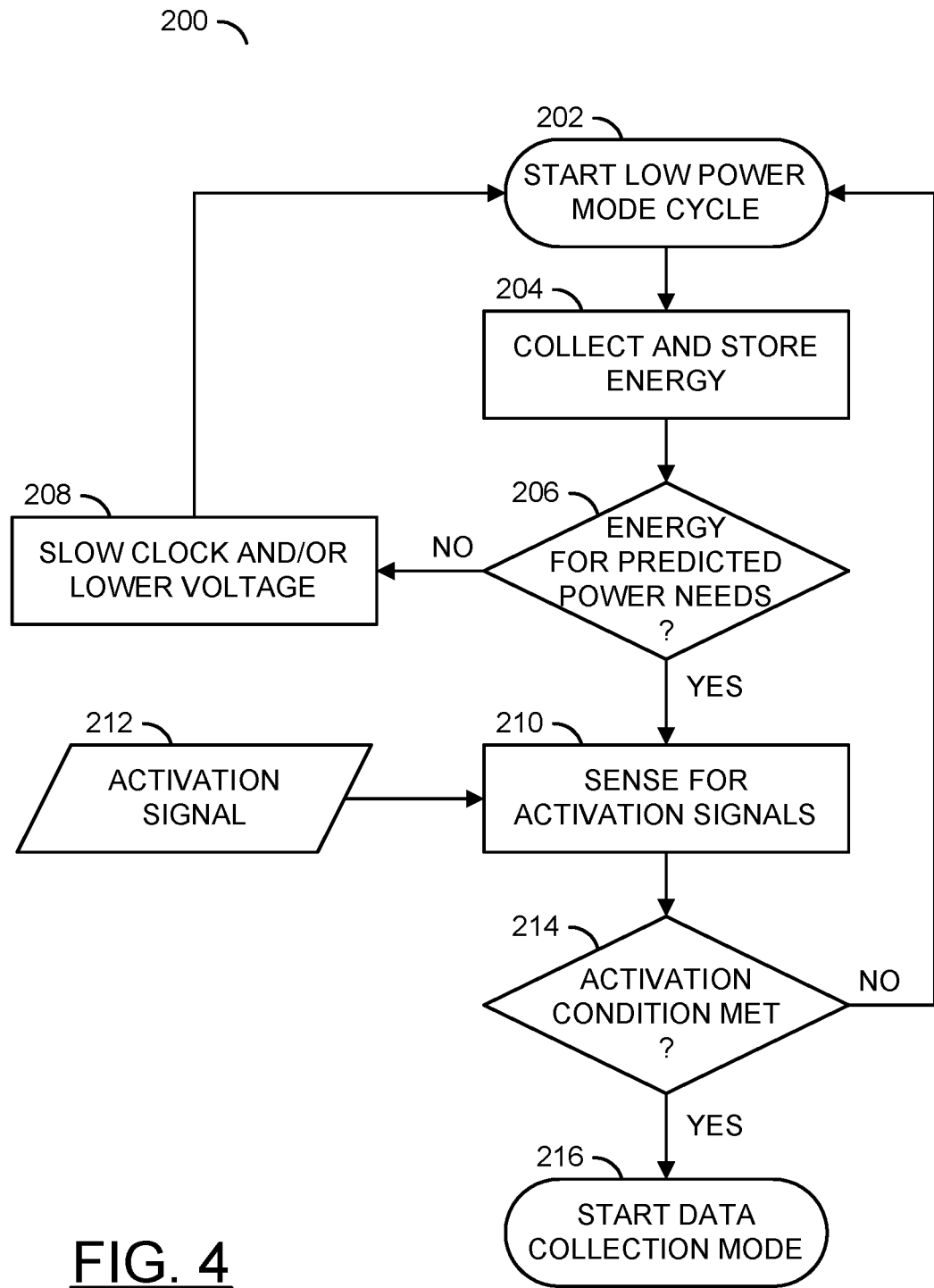
FIG. 4 is a flow diagram illustrating a low power activation signal monitoring mode cycles.

Referring to FIG. 4, a method (or process) 200 is shown. The method 200 illustrates an example of a low power activation signal monitoring process. The method 200 generally comprises a step (or state) 202, a step (or state) 204, a decision step (or state) 206, a step (or state) 208, a step (or state) 210, a step (or state) 212, a decision step (or state) 214, and a step (or state) 216. The step 202 may start a low power mode cycle (or process). Next, the step 204 may collect and store energy. Next, the step 206 may determine the amount of energy needed for the predicted power usage. If there is not enough energy stored, the method 200 moves to the step 208. To reduce power usage, the step 208 may slow down an internal clock to the CPU 158 and/or may lower the operating voltage. If there is enough energy for the predicted power needs, the method 200 moves to the step 210. The step 210 senses one or more activation signals. If an activation signal is present, such as a signal received from the step 212, the decision step 214 determines if an activation condition has been met. If not, the method 200 moves back to the step 202. If an activation condition has been met, the method 200 moves to the step 216. The step 216 starts a data collection mode (to be described in more detail in connection with FIG. 5).

Figure 5:
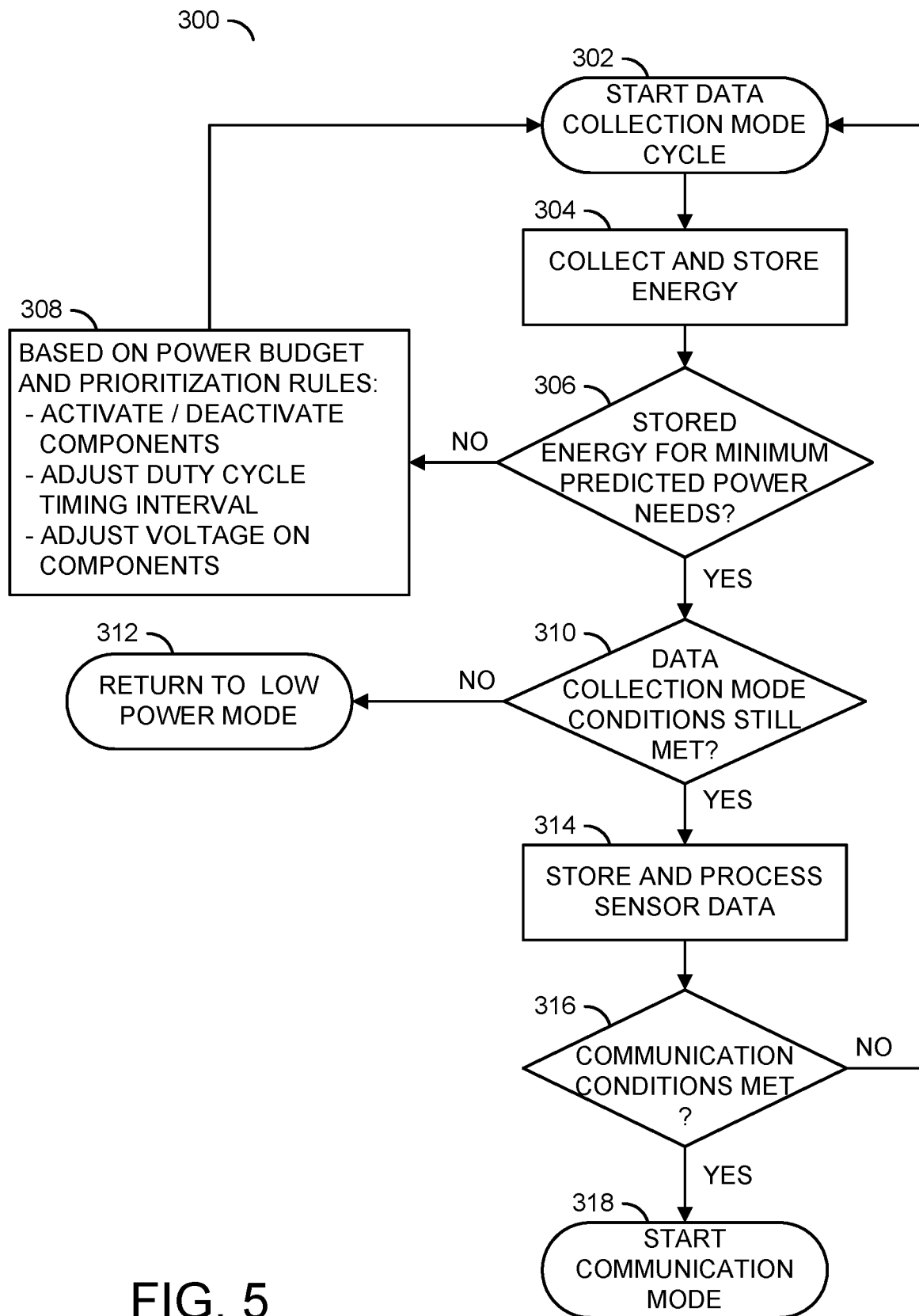
FIG. 5 is a flow diagram showing a power-aware data collection mode cycle.

Referring to FIG. 5, a method (or process) 300 is shown. The method 300 illustrates an example of a power-aware data collection process. The method 300 comprises a step (or state) 302, a step (or state) 304, a decision step (or state) 306, a step (or state) 308, a step (or state) 310, a step (or state) 312, a step (or state) 314, a step (or state) 316, and a step (or state) 318. The step 302 starts the data collection mode cycle. Next, the step 304 collects and stores energy. Next, the step 306 determines if enough energy has been stored to perform a minimum predicted operation based on the predicted power needs. If not, the method 300 moves to the step 308. The step 308 may perform a number of prioritization rules based on a power budget. For example, the step 308 may activate/deactivate one or more components, adjust the duty cycle and/or timing interval, adjust a voltage on the components or other power saving parameters (or rules). If there is enough energy stored for the predicted power needs, the method 300 moves to the state 310. The decision state 310 determines if the conditions are still met to remain in the data collection mode. If not, the method 300 moves to the state 312, which returns to the lower power mode. If the conditions are still met, the method 300 moves to the state 314. The state 314 stores and processes sensor data. Next, the decision state 316 determines if the communication conditions have been met. If not, the method 300 moves back to the state 302. If the communication conditions have been met, the method 300 moves to the state 318. The state 318 starts the communication mode (to be described in more detail in connection with FIG. 7).

Figure 6:
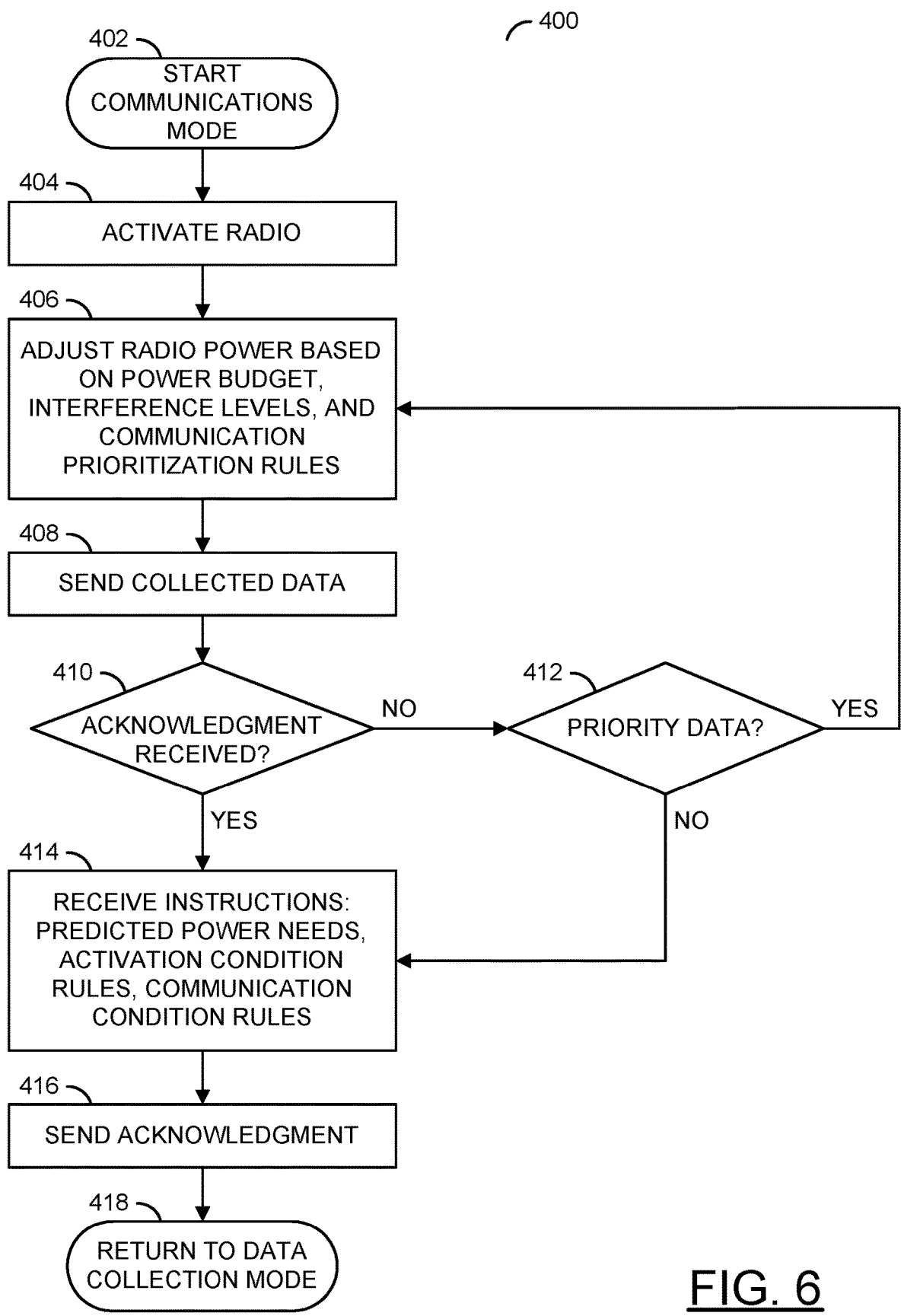
FIG. 6 is a flow diagram showing a power-aware communications mode.

Referring to FIG. 6, a method (or process) 400 is shown. The method illustrates a power-aware communications mode. The method 400 generally comprises a step (or state) 402, a step (or state) 404, a step (or state) 406, a step (or state) 408, a decision step (or state) 410, a decision step (or state) 412, a step (or state) 414, a step (or state) 416, and a step (or state) 418. The state 402 starts the communication mode. Next, the state 404 activates the radio (or wireless transceiver). Next, the state 406 adjusts the broadcast power of the radio based on a power budget, interference levels, and/or communication prioritization rules. Next, the method 400 moves to the state 408. The state 408 sends collected data. Next, the decision state 410 determines if an acknowledgment has been received. If not, the method 400 moves to the decision state 412. The decision state 412 determines if the data received is priority data. Priority data may be considered data that may break low power operation rules. If so, the method 400 moves back to the state 406. If the data is not priority data, the method 400 moves to the state 414. In the decision state 410, if an acknowledgment has been received, the method 400 moves to the state 414. In the state 414, the method 400 receives instructions related to predicted power needs, activation condition rules, and/or communication rules. Next, the method 400 moves to the state 416, which sends an acknowledgment. Next the state 418 returns to the data collection mode (e.g., the process 300).

Figure 7:
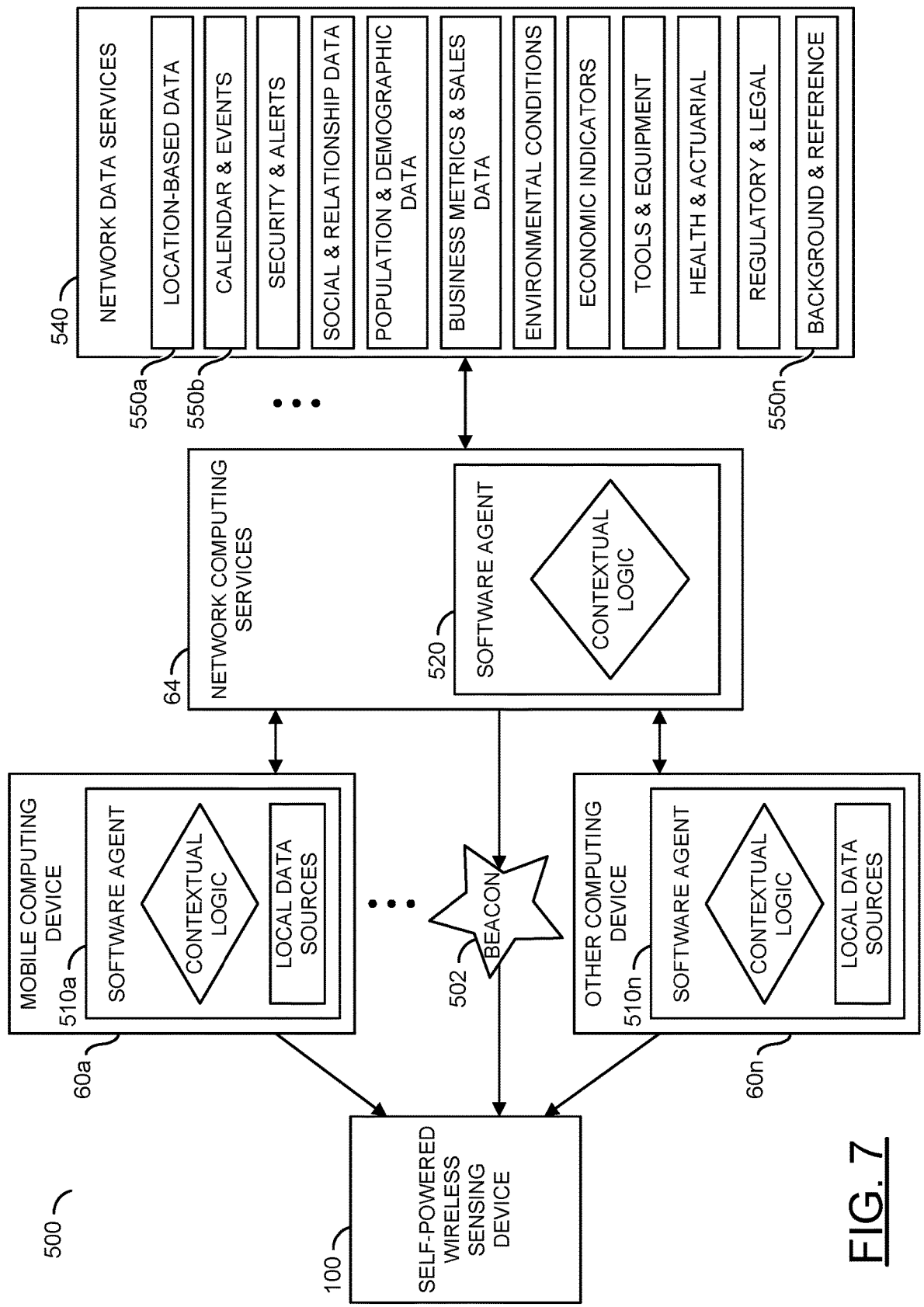
FIG. 7 is a context diagram showing wireless signal configurations.

Referring to FIG. 7, a context diagram of a system 500 showing wireless signal configurations is shown. The memory 166 may contain instructions outlining a set of threshold conditions for storing sensed data (e.g., the process 300). The memory 166 may also contain instructions outlining a set of threshold conditions for transmitting sensed data (e.g., the process 400). The instructions for storing and/or transmitting data may be based on a power budget and/or available power. The instructions may contain computational logic for computing a threshold condition based on one or more types of sensed data and/or one or more data points over time. A beacon 502 is shown connected between the network computing services block 64 and the wireless sensing device 100. The beacon 502 may be used to send a signal from the network computing device 64 to the sensor node 100. The beacon 502 may send a signal to wake up the node 100, or to prepare the node 100 to receive new instructions, etc. A software agent block 510*a* is shown in the mobile computing device 60*a*. Similarly, a software agent block 510*n* is shown in the computing device 60*n*. A software agent block 520 is shown in the network computing services block 64. The software processing may be distributed between the mobile computing devices 60*a*-60*n* and the network computing services block 64. A network data services block 540 is shown connected to the network computing services block 64. The network data services block shows a number of classifications of network data services 550*a*-550*n*.

In one example, the computational logic may include a cascade (e.g., one or more) of threshold conditions that may be used to determine when additional features of the sensor node 100 will be powered on or powered off. For example, when the sensor node 100 determines that one of the sensors (e.g., a sensor A) detects a signal over a determined threshold, then one or more other sensors (e.g., a sensor B and/or a sensor C) may be activated. In another example, when the sensor node 100 determines that the sensor B in combination with the node C are below a threshold, then the sensors B and C may be turned off. In such an example, one of the sensors 108*a*-108*n* may be awake (or operational) continuously. Other sensors 108*a*-108*n* may only be powered on when the sensor node 100 determines that monitoring is needed (e.g., by the continuously operated one of the sensors 108a-108n). Other input parameters may be uploaded by the mobile computing device 60 to the sensor node 100. Such parameters may include a schedule of when sensor data should be captured and/or stored.

The computational logic cascade may implement a power-aware prioritization of sensor data capture and/or communications information. For example, when power stored in the ESU circuit 156 is low, the duty cycle of the sensor node 100 may be changed less frequently. In one example, the logic may only receive signals from the sensors 110a-110b when power is sufficient.

The computational logic may include logic for coalescing data, such as only recording changes to a base state or expected state. A computationally efficient process may be implemented. For example, a process that only records the average value of one or more of the sensors 110a-110n over a period of time may be used. The sensor 100 may begin to record events if a measurement received from the sensors 110a-110n is significantly above average.

Since the sensor nodes 100a-100n are self-powered (through the energy storage unit 156), the power budget of the sensor nodes 100a-100n is generally kept small. By capturing additional energy with the ECU 154, the nodes 100a-100n may operate for long periods of time on a single battery. The energy storage unit 156 may be implemented as a battery or other storage device. The energy capture unit 154 may store energy through various sources, such as energy created through harvesting of light, vibration, thermal variation, thermal gradient, infrared, chemical, RF sources or some combination.

The computational logic for determining the threshold conditions for storing and/or transmitting data may be based on currently available power, predicted future energy harvesting opportunities (e.g., based on forecasting the future environment), and/or predicted energy consumption (e.g., based on applying the threshold rules to the forecast environment).

A machine learning process that optimizes the predictive model may be set up as a series of energy input functions and/or energy consumption functions with scaling factors that are optimized based on historical data for the sensor nodes 100a-100n. Based on prior patterns, the model may operate with techniques of machine learning optimization including, but not limited to, a least square minimization of the difference between model predictions and actual historical data, various gradient descent techniques, etc.

In order to adapt the duty cycle, the sensor sampling rates, the adaptive and conditional powering of additional sensors based on a set of initial sensors, the data storage and data transmission policies of the sensor node 100, each energy use in the system 50 may be characterized as an energy cost function. For example, energy harvesting may be a negative cost, or energy contribution. Each data captured may be characterized as a utility or benefit function. An optimization may be performed to maximize the utility within a set of cost parameters. Alternatively, optimization may be performed to maximize utility per unit of cost.

In one example, the remote computing device 60 may be a local device on the edge of the network. For example, the remote computing device 60 may be implemented as a smartphone, or personal digital assistant (PDA) type device, which in turn is connected to the central data storage and computing facility 64. In such an implementation, some or all of the computational logic for determining the threshold conditions and/or rules may be implemented on the devices 60a-60n. In such an example, only the threshold values (or simplified rules) may need to be transmitted to the sensor nodes 100a-100n. In one example, a subset of the processing is done on the sensor nodes 100a-100n. If power is not an issue, the devices 60a-60n may capture a more complete stream of data from the local sensor nodes. The data may then be processed and/or be evaluated locally before being sent to a central server on the computers facility 64. Such an implementation may reduce network traffic and/or storage needed at the central data center 64. The central data center 64 may send program instructions to one or more of the smartphones 60a-60n for computing threshold conditions. The program instructions may in turn be sent to one of the sensor nodes 100a-100n.

Various sources of data may be used to generate energy consumption and/or harvesting predictions. Such sources may include (i) a schedule of upcoming calendar events in the neighborhood of the sensor, (ii) the proximity to or presence of nearby people, objects, buildings, vehicles, (iii) security or threat conditions that increase the importance of sensing, (iv) location-based data (such as features of the location of the sensor), (v) weather forecasts and/or other environmental conditions, (vi) scheduled or location-based energy harvesting opportunities, (vii) presence of increased ambient or directed RF power, (viii) known or observed cycles including day, week, month, season, and/or (ix) other patterns in prior data.

Various energy harvesting technologies may be used in the energy capture unit 154. Examples of such technologies include piezoelectric effects of stress and/or strain, vibration, thermal gradient, thermal variation, solar photovoltaic, ambient light photovoltaic, infrared, radio frequency, chemical energy, air or fluid flow, and electromagnetic fields. Many of these effects are context dependent and may vary with location, time, proximity to other devices or environmental features and other factors. Being able to predict future energy inputs based on the context of the sensor node 100 may help to determine the current power budget.

In addition to the environmental context, the predicted power inputs and predicted power consumption may take into account various application rules encoded in the control logic of the memory 166. Such inputs may be used to determine the duty cycle sensor node 100, the sampling rate of the sensor, the conditional powering of different components, as well as the data storage and/or data transmission policies.

In an example of a security application used to detect intruders, the sensor node 100 may have a very different predicted power need than the same presence or proximity sensor node 100 used to optimize lighting and heating based on building or room usage. The security application may consume power when an office is closed. The lighting and heating application may need to be active during the scheduled office hours. The energy harvesting opportunities may also be different. The security application may need to store enough power during the day to last throughout the night. The office energy application may be able to harvest enough energy during the day to meet most needs. The transmission policies for the security application may be immediate when outside of office hours. The transmission policy for the energy application may be daily or weekly. In another example, a seismic vibration sensor might have a high sampling rate after an initial threshold event, while a temperature sensor might be needed less frequently. For many applications, a diminishing return on the value of the data occurs at higher sampling rates. The particular value depends on the application.

The predicted power needs and/or harvesting opportunities may be computed through machine learning techniques in which the contribution of environmental features to energy harvesting and energy consumption are learned based on prior observations. For example, consider an application where during a time interval $t_i$, and at location l, energy contribution or cost is expressed as a linear relationship between a set of environmental features f and energy the contribution by the following equation:

$$\Delta e(t_i, l) = a_1 f_1(t_i, l) + a_2 f_2(t_i, l) + a_3 f_3(t_i, l) + a_4 f_4(t_i, l)$$

For environmental factors that cost energy, the scaling factors are negative. For environmental conditions that add to energy harvesting, the factor is positive. The change in energy does not go over the storage capacity of the node. The charge does not generally fall under a threshold without shutting down the sensor node 100.

For a time series over all the time intervals, an expression with F being a matrix (where each row is a time interval and each column is a feature) may result in a total energy contribution or drain from environmental factors of $$E = \underline{F} \times \underline{a}$$

The time intervals before the current time, the actual features and/or energy needs or contributions have already been measured and may be considered the ground truth or training set for a predictive model. The scaling factors may be fit using well known machine learning techniques. The functions describing dependence of the change in energy and features of the environment may first be estimated with known relationships (e.g., such as solar radiation and the contribution to a photovoltaic) so that the machine learning is focused on scaling the relationship to the particular sensor node rather than discovering the relationship in the first place. The sensor node 100 may be implemented with known components. The energy inputs and/or cost functions of such known components should be related to the technology used. The scaling factors are normally related to the context and/or application. In order to create the most efficient power management in a wireless sensor network, the machine learning techniques may be trained with data collected on a subset of the sensor nodes and/or for a subset of time. The power budget and/or power predictions may be calculated at a central computer in the network computing services block 64 for larger calculations. For calculations with fewer features, the power budget may be calculated on the remote computing device 60. The results of the optimization of the model may be communicated to the sensor node 100 in the form of program instructions and/or thresholds.

The optimization of the scaling factors of the predictive model may also take into account the effect of the control logic and the rules currently in use to adapt the duty cycle sensor of the node 100, the sensor sampling rate, as well as the data recording and/or transmission policies. The functions that express the relationship between a predicted feature of the environment or context to power consumption can include the rules in the calculation so that the optimization is application-specific.

The functions performed by the diagrams of FIGS. 4-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a power source to store energy;
   one or more sensors to capture data received from one of a plurality of sources;
   a transceiver to send and receive communications to and from a wireless network;
   a processor to execute computer readable instructions; and
   a memory to store a set of instructions executable by the processor, said instructions are executed to (A) evaluate an expected power usage calculated using a predictive model of future energy consumption, (B) store said data in the memory in a first mode and (C) transmit the data to a remote storage device in a second mode, wherein the instructions include (a) a machine learning process to train said predictive model in response to prior power usage patterns and (b) computational logic for computing a threshold condition to determine the first mode or the second mode.

2. The apparatus according to claim 1, wherein said one or more sensors receive said data from an external device.

3. The apparatus according to claim 1, wherein said one or more sensors receive said data from forces acting on said apparatus.

4. The apparatus according to claim 1, wherein said instructions are updated through the wireless network.

5. The apparatus according to claim 1, further comprising:
   a remote computing device removed from the apparatus to selectively couple to the apparatus and collect said data and transmit new instructions to the apparatus.

6. The apparatus according to claim 5, wherein the remote computing device uploads to the one or more sensors a schedule of when said data is to be captured and stored.

7. The apparatus according to claim 1, wherein the instructions contain a set of threshold conditions for storing said data in the first mode.

8. The apparatus according to claim 1, wherein the instructions contain a set of threshold conditions for transmitting said data in the second mode.

9. The apparatus according to claim 1, wherein said computational logic includes a cascade of threshold conditions that determine a powering on or off of additional features of said one or more sensors.

10. The apparatus according to claim 9, wherein the cascade has a power-aware prioritization of said data capture and communications to lower a duty cycle to average power.

11. The apparatus according to claim 1, wherein the instructions coalesce said data by only recording changes when compared to a base state or expected state.

12. The apparatus according to claim 1, wherein said instructions provide a computationally efficient process to only record an average value of the data captured by the sensors over a period of time and then starts recording events if a measurement is significantly above the average value.

13. The apparatus according to claim 1, wherein the apparatus is self-powered through said power source.

14. The apparatus according to claim 1, wherein said power source is implemented as a battery.

15. The apparatus according to claim 1, wherein said power source is replenished through energy harvesting of light, vibration, thermal variation, thermal gradient, infrared, chemical, RF sources or some combination.

16. The apparatus according to claim 1, wherein the computational logic determines said threshold condition for storing and transmitting said data based on (i) currently available power, (ii) predicted future energy harvesting opportunities based on forecasting a future environment, and (iii) predicted energy consumption based on applying the threshold condition to the future environment.

17. The apparatus according to claim 1, wherein the training is performed to maximize a utility within a set of cost parameters, or alternatively, to maximize utility per unit of cost.

18. An apparatus comprising:
    a power source to store energy;
    one or more sensors to capture data from a plurality of sources;
    a transceiver to send and receive communications to and from a wireless network;
    a processor to execute computer readable instructions; and
    a memory to store a set of instructions executable by the processor, said instructions, when executed (A) evaluate an expected power usage calculated using a predictive model of future energy consumption, (B) store said data in the memory in a first mode and (C) transmit the data to a remote storage device in a second mode, wherein (i) said first mode and said second mode are selected based on characteristics of the data, (ii) energy use by the apparatus is characterized as an energy cost function, (iii) powering of additional sensors is determined based on a set of initial sensor readings and (iv) energy harvesting is an energy contribution in the predictive model.

19. A method for implementing predictive power management in a wireless sensor network, comprising the steps of:
    (A) storing energy;
    (B) capturing data from a plurality of sources using one or more sensors;
    (C) sending and receiving communications to and from a wireless network using a transceiver;
    (D) storing, using a memory, a set of instructions executable by a processor;
    (E) executing computer readable instructions using the processor;
    (F) evaluating an expected power usage calculated using a predictive model of future energy consumption;
    (G) storing the data in the memory in a first mode; and
    (H) transmitting the data to a remote storage device in a second mode, wherein the instructions include (a) a machine learning process to train the predictive model in response to prior power usage patterns and (b) computational logic for computing a threshold condition to determine the first mode or the second mode.

* * * * *